(12) United States Patent  
Gaudet

(10) Patent No.: US 6,970,956 B1  
(45) Date of Patent: Nov. 29, 2005

(54) SCALEABLE GAP INSERTION IN A DATA LINK

(75) Inventor: Brian Gaudet, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 424 days.

(21) Appl. No.: 09/966,094

(22) Filed: Oct. 1, 2001

(51) Int. Cl.$^7$ .............................................. G06F 3/00
(52) U.S. Cl. ........................ 710/30; 710/61; 370/528
(58) Field of Search ................. 370/470, 477, 370/474, 528, 503; 709/232; 341/60, 50, 341/95; 710/30, 61

(56) References Cited

U.S. PATENT DOCUMENTS

| | | | | |
|---|---|---|---|---|
| 4,506,303 A | * | 3/1985 | Hannan ..................... | 358/302 |
| 5,617,419 A | * | 4/1997 | Christensen et al. ........ | 370/471 |
| 5,644,577 A | * | 7/1997 | Christensen et al. ........ | 370/506 |
| 5,671,223 A | * | 9/1997 | Shachar et al. ............. | 370/471 |
| 6,088,369 A | * | 7/2000 | Dabecki et al. ............. | 370/503 |
| 6,249,525 B1 | * | 6/2001 | Aggarwal et al. .......... | 370/413 |
| 2001/0012288 A1 | * | 8/2001 | Yu .............................. | 370/352 |
| 2002/0141370 A1 | * | 10/2002 | Abrol et al. ................ | 370/338 |

OTHER PUBLICATIONS

W. Simpson, "PPP in HDLC-like Framing," Jul. 1994, pp. 1-23, http://www.ietf.org/rfc/rfc1662.txt?number=1662.

* cited by examiner

Primary Examiner—Kim Huynh  
(74) Attorney, Agent, or Firm—Harrity & Snyder LLP

(57) ABSTRACT

A pipelined escape character insertion component sequentially includes a character specific gap inserter and an expansion component. The gap inserter inserts gaps into blocks of data in a received data stream in which data elements within the blocks correspond to control elements. The expansion component receives the blocks of data elements with the inserted gaps and rearranges the gaps to positions adjacent to the data elements that correspond to the control elements. Additionally, an escape character follows the expansion component and inserts escape characters in the inserted gaps.

23 Claims, 8 Drawing Sheets

| Input Byte | Sum | Bit Mask | Shifted Bytes | After Byte Unpacker | After Escape Character Inserter |
|---|---|---|---|---|---|
| A | 1 | 1 | — | A | A |
| $\hat{B}$ | 3 | 1 | A | $\hat{B}$ | h7D |
| C | 4 | 1 | $\hat{B}$ | C | $\hat{B} \oplus$ h20 |
| D | 5 | 0 | C | | C |

Fig. 7

SCALEABLE GAP INSERTION IN A DATA LINK

BACKGROUND OF THE INVENTION

A. Field of the Invention

The present invention relates generally to high-speed data communications and, more particularly, to the framing of data transmitted over point-to-point links.

B. Description of Related Art

In certain high-speed data transmission links, data is transmitted as a continuous stream. For example, in the packet-over-SONET (POS) optical protocol, packets may be transmitted as a continuous data stream of bytes in which a number of consecutive bytes may comprise a larger unit of data such as a packet. Because no control information is transmitted external to the data stream, the receiving device delineates between packets in the stream based solely on the content of the stream.

In one conventional technique for framing such data streams, the receiving device delineates between packet boundaries by looking for predefined control bytes that are inserted within the data stream. Occasionally, actual content data may coincidentally have the same value as the control information. In this situation, the content data is preceded by an "escape byte" that lets the receiving device know that the next byte is content data.

FIGS. 1A and 1B are configurations of an exemplary stream of bytes before and after insertion of escape bytes. In FIG. 1A, a stream of four bytes 100 includes "h10", "h7D", "h08", and "h7E", where "h" indicates that the numbers are base 16 (hexadecimal) numbers. In this example, assume that "h7D" is used as the predetermined escape byte and "h7E" is a predetermined control byte that indicates the end of a packet.

The second and fourth bytes of packet stream 100 contain data that is identical to the escape byte "h7D" and the control byte "h7E", respectively, and should therefore be escaped. FIG. 1B illustrates stream 100 after having "h7D" and "h7E" replaced. The second byte, "h7D," is replaced with the escape character "h7D" followed by the original byte exclusive ORed with "h20." The fourth byte, "h7E," is replaced with the escape character "h7D" followed by the original byte exclusive ORed with "h20." In this manner, the original four byte stream is expanded to a six byte stream.

The exclusive OR operation is performed so that the transmitted byte will no longer be a control character. The receiving device receives the escaped data stream of FIG. 1B, recognizes the "h7D" escape characters, removes the "h7D" escape characters, and XORs the character following the escape character with "h20" to thus recover the original data stream 100.

In high-bandwidth situations, a number of byte streams may be received simultaneously to create a multi-byte datapath. For example, in a three byte datapath, the bytes of a packet may be transmitted and received simultaneously in three byte blocks.

An escaping circuit for inserting escape characters in a multi-byte datapath, in one implementation, includes a number of pipelined stages. The first stage surrounds each received byte with blank bytes. A second stage of the pipeline then examines the data stream and, when appropriate, inserts escape characters in the blank bytes. A third stage is a "bytepacker" that compresses the data stream to remove any remaining blank bytes. One problem associated with this implementation is that as the datapaths become wider (e.g., a 32 byte datapath), the logic required to implement the pipeline stages, and in particular, the bytepacking stage, increases to a potentially untenably complicated level.

Thus, there is a need in the art to implement an efficient escaping circuit that easily scales as the size of the datapath increases.

SUMMARY OF THE INVENTION

Systems and methods consistent with the principles of the invention, among other things, efficiently insert escape characters in a multi-byte data path.

One aspect of the invention is directed to a device for inserting escape characters into a multi-byte wide data stream. The device includes a gap insertion component that receives blocks of data of the multi-byte wide data stream and rearranges the bytes of a block of the data stream by inserting gaps into the block at locations adjacent to bytes that have a value coincident with predefined control characters. Additionally, an escape character inserter inserts escape characters in each of the gaps inserted by the gap insertion component.

A second aspect of the invention is directed to a method for inserting gaps in a data stream that includes a number of data elements transmitted as parallel blocks of data. The method includes generating a sum for each data element of an active block based on whether the data element has a value equivalent to a control character and on the sum of more significant data elements in the active block. Additionally, the method includes comparing the sum associated with each of the data elements of the active block with a total number of data elements in the active block and creating a bit mask based on the comparison. Finally, the method includes shifting a number of data elements out of the active block based on the bit mask.

In yet another aspect of the invention, a network device includes a switch fabric and a number of processing elements. The processing elements communicate with one another over the switch fabric and receive external information formatted as data items in a multi-item wide data stream. Moreover, at least one interface connects to each of the processing elements. The interface formats the data streams before transmitting the data stream to others of the processing elements. The interface includes a gap insertion component that rearranges blocks of the data items by inserting gaps in the blocks of the data items at locations adjacent to the data items that have a value coincident with a predefined control character, and an escape character inserter that inserts escape characters in each of the gaps inserted by the gap insertion component.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 7 illustrates exemplary values of a four byte wide data stream; and

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

As described herein, a pipelined escape character inserter efficiently inserts escape characters into a continuous multi-byte datapath. The escape character inserter includes stages that insert gaps into the datapath only where necessary. A final stage fills in the gaps with the appropriate escape characters.

System Description

Figure 1A:
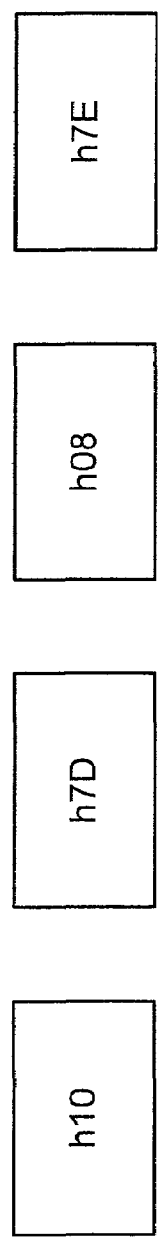
FIGS. 1A and 1B are configurations of an exemplary stream of bytes before and after insertion of escape bytes.
Figure 1B:
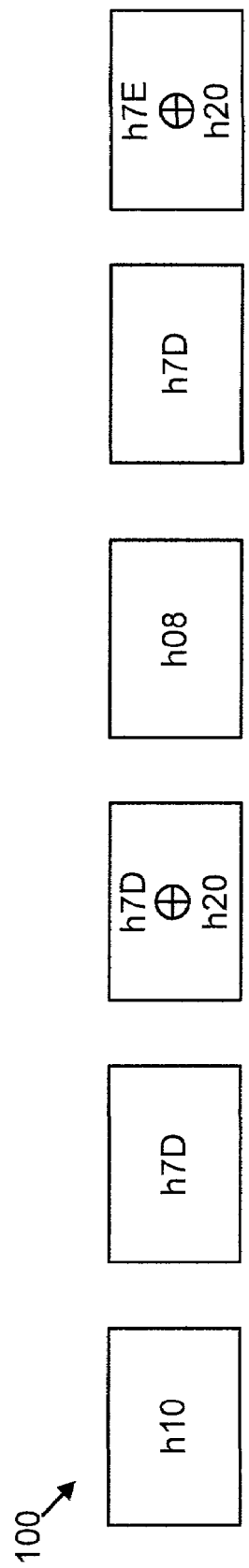
Figure 2:
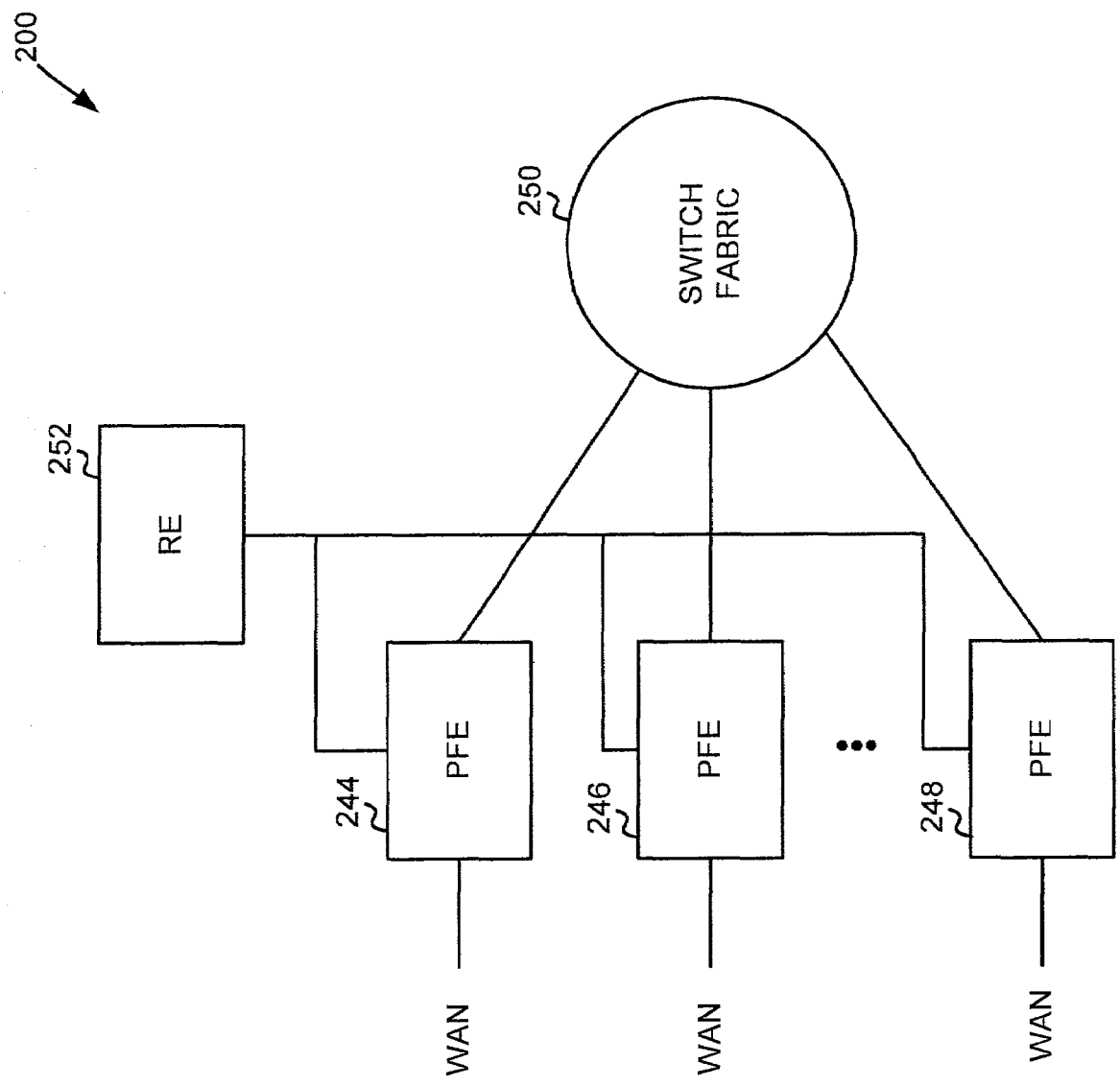
FIG. 2 is a block diagram illustrating an exemplary routing system in which systems and methods consistent with the principles of the invention may be implemented.

FIG. 2 is a block diagram illustrating an exemplary routing system 200 in which the principles of invention may be implemented. System 200 includes packet forwarding engines (PFEs) 244, 246 . . . 248, a switch fabric 250, and a routing engine (RE) 252. System 200 receives a data stream from a physical link, processes the data stream to determine destination information, and transmits the data stream out on a link in accordance with the destination information.

RE 252 performs high level management functions for system 200. For example, RE 252 communicates with other networks and systems connected to system 200 to exchange information regarding network topology. RE 252 creates routing tables based on network topology information and forwards the routing tables to PFEs 244, 246, and 248. The PFEs use the routing tables to perform route lookup for incoming packets. RE 252 also performs other general control and monitoring functions for system 200.

PFEs 244, 246, and 248 connect to RE 252 and switch fabric 250. PFEs 244, 246, and 248 receive data at ports on physical links connected to a network, such as a wide area network (WAN). Each physical link could be one of many types of transport media, such as optical fiber or Ethernet cable. The data on the physical link is formatted according to one of several protocols, such as the synchronous optical network (SONET) standard, an asynchronous transfer mode (ATM) technology, or Ethernet.

PFE 244 will be used to discuss the operations performed by PFEs 244, 246, and 248 consistent with the principles of the invention. PFE 244 processes incoming data by stripping off the data link layer. PFE 244 converts header information from the remaining data into a data structure referred to as a notification.

For example, in one embodiment, the data remaining after the data link layer is stripped off is packet data. PFE 244 converts the layer 2 (L2) and layer 3 (L3) packet header information included with the packet data into a notification. PFE 244 stores the notification, some control information regarding the packet, and the packet data in a series of cells.

In one embodiment, the notification and the control information are stored in the first two cells of the series of cells.

PFE 244 performs a route lookup using the notification and the routing table from RE 252 to determine destination information. PFE 244 may also further process the notification to perform protocol-specific functions, policing, and accounting, and might even modify the notification to form a new notification.

If the destination indicates that the packet should be sent out on a physical link connected to PFE 244, then PFE 244 retrieves the cells for the packet, converts the notification or new notification into header information, forms a packet using the packet data from the cells and the header information, and transmits the packet from the port associated with the physical link.

If the destination indicates that the packet should be sent to another PFE via switch fabric 250, then PFE 244 retrieves the cells for the packet, modifies the first two cells with the new notification and new control information, if necessary, and sends the cells to the other PFE via switch fabric 250. Before transmitting the cells over switch fabric 250, PFE 244 appends a sequence number to each cell, which allows the receiving PFE to reconstruct the order of the transmitted cells. Additionally, the receiving PFE uses the notification to form a packet using the packet data from the cells, and sends the packet out on the port associated with the appropriate physical link of the receiving PFE.

In summary, RE 252, PFEs 244, 246, and 248, and switch fabric 250 perform routing based on packet-level processing. The PFEs store each packet using cells while performing a route lookup using a notification, which is based on packet header information. A packet might be received on one PFE and go back out to the network on the same PFE, or be sent through switch fabric 250 to be sent out to the network on a different PFE.

Figure 3:
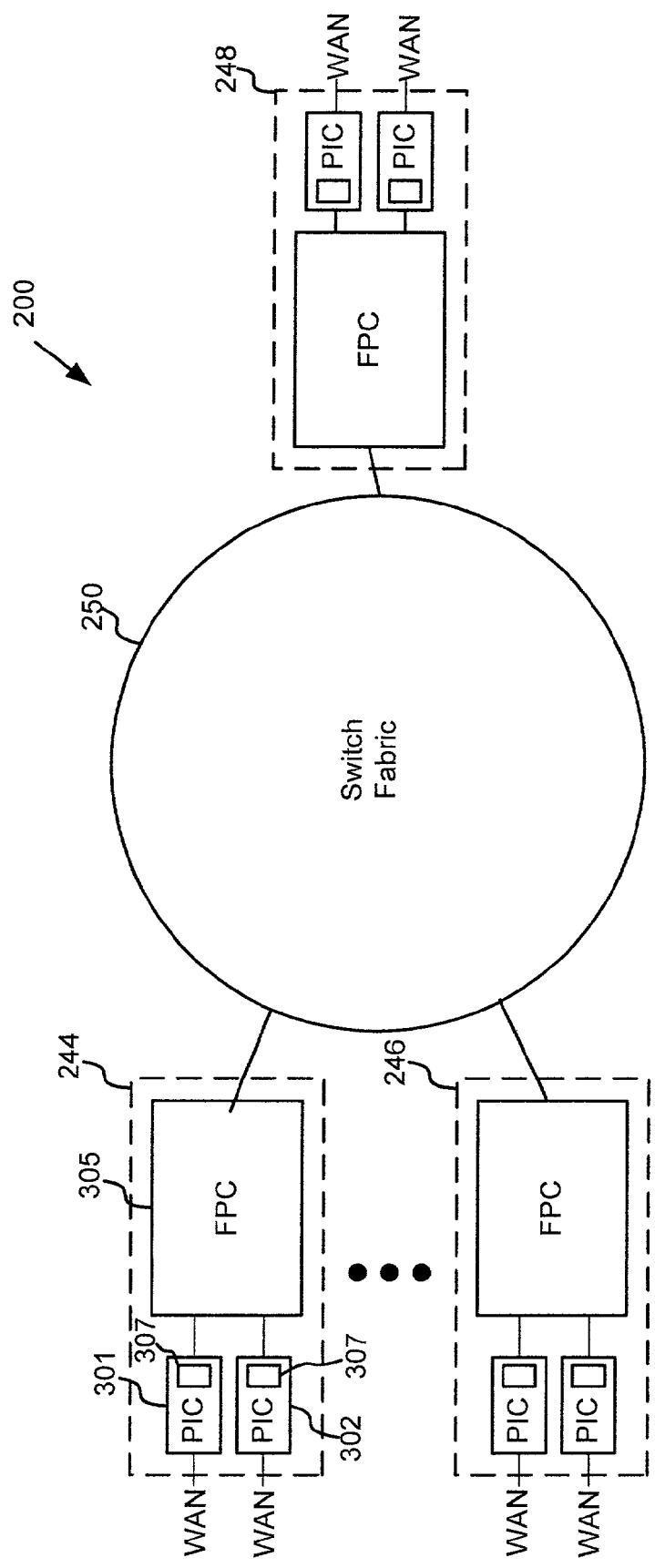
FIG. 3 is a detailed block diagram illustrating portions of the routing system shown in FIG. 1.

FIG. 3 is a detailed block diagram illustrating portions of routing system 200. PFEs 244, 246, and 248 connect to one another through switch fabric 250. Each of the PFEs may include one or more physical interface cards (PICs) 301–302 and flexible port concentrators (FPCs) 305.

PIC 301 may include interfacing, processing, and memory elements necessary to transmit data between a WAN physical link and FPC 305. Different PICs are designed to handle different types of WAN physical links. For example, PIC 301 may be an interface for an optical link while PIC 302 may be an interface for an Ethernet link. Although FIG. 3 shows two PICs connected to the FPCs, in other embodiments consistent with principles of the invention there can be more or fewer PICs connected to an FPC. PICs 301 and 302 communicate with FPC 305 through PIC communication component 307. In one embodiment, communication component 307 implements a point-to-point continuous data stream with FPC 305. The data stream may be a multi-byte stream that uses predefined characters to embed control information, such as end-of-packet and errored packet information. Escape characters may be used to transmit data that has the same value as the control characters.

FPCs, such as FPC 305, handle packet transfers to and from PICs 301 and 302, and switch fabric 250. For each packet it handles, FPC 305 performs the previously-described route lookup function.

Figure 4:
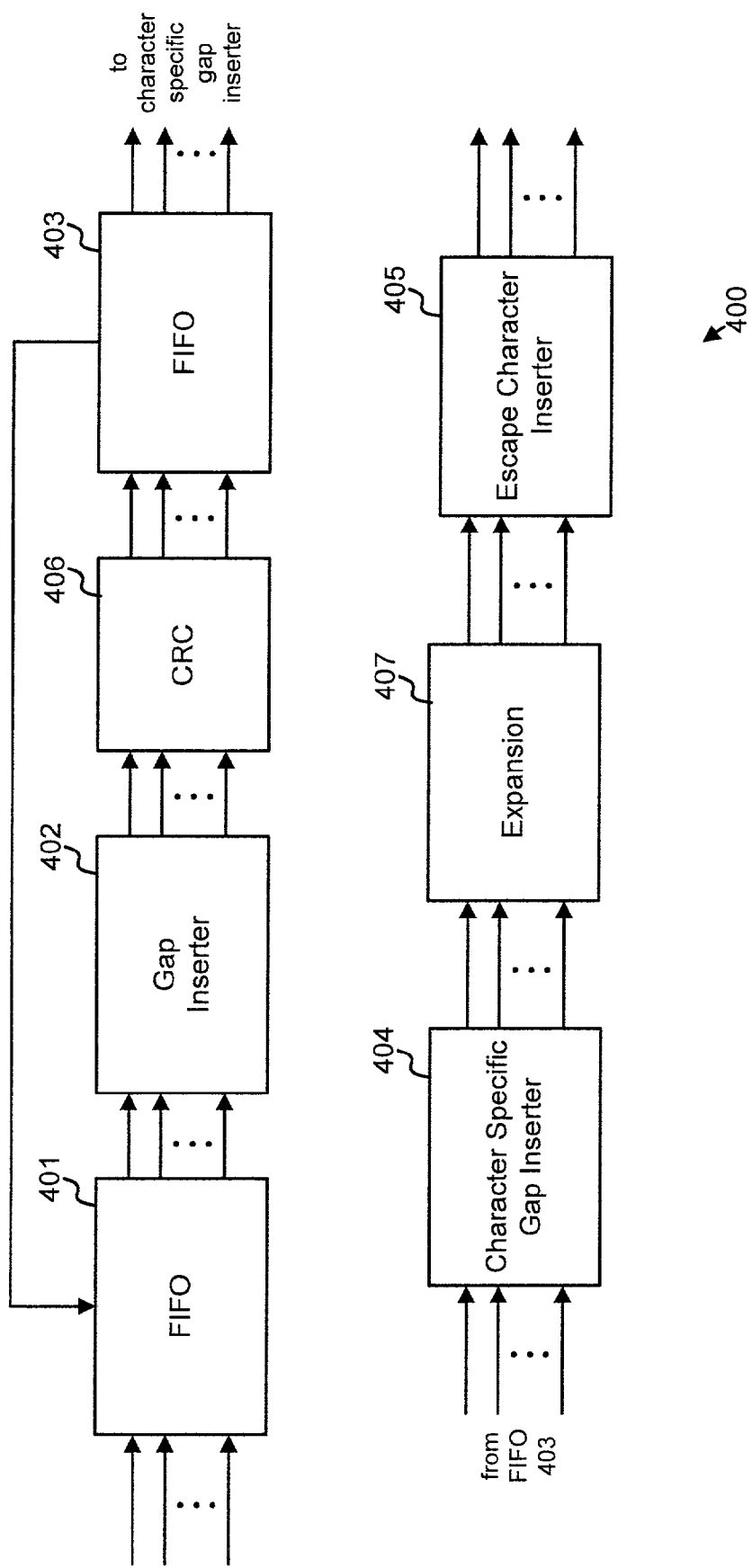
FIG. 4 is a block diagram illustrating an escape character insertion component consistent with the principles of the present invention.

FIG. 4 is a block diagram illustrating an escape character insertion component 400, used in inserting escape characters in a data stream. Escape character insertion component 400 may be implemented within communication component 307. In alternative embodiments, escape character insertion component 400 may be implemented externally to communication component 307. For example, PICs 301 and 302 may receive and pass an escaped data stream from the external WANs to FPC 305.

Escape character insertion component 400 includes a first queue 401, such as a first-in-first-out (FIFO) queue, a gap inserter 402, a cyclic-redundancy-check (CRC) component 406, a second FIFO queue 403, a character specific gap inserter 404, an expansion component 407, and an escape character inserter 405. FIFO 401 receives NB byte wide blocks of data (e.g., NB equals 32 for a 32 byte wide continuous stream of data) from the data stream and buffers the incoming data stream for gap inserter 402. In general, gap inserter 402 passes the received data stream to FIFO 403 with an initial set of gaps included in data blocks so that end-of-packet and CRC information can be inserted.

More specifically, gap inserter 402 examines its input stream from FIFO 401 and inserts gaps in the stream when it detects an end of a packet. In one implementation, for normal packets, gap inserter 402 inserts either three or five bytes depending on the type of packet. If the packet is a packet that uses a two-byte CRC, gap inserter 402 inserts a three-byte gap (one for an end-of-packet control character and two for the CRC). Otherwise, if the packet is a packet that uses a four-byte CRC, gap inserter 402 inserts a five-byte gap (one for the end-of-packet control character and four for the CRC). In either case, if the packet includes an error, gap inserter 402 adds an additional byte to the gap for an errored-packet control character.

CRC 406 calculates the CRC value for the packets and inserts it into the gaps created by gap inserter 402. The packet streams, with their inserted CRC information, are then transmitted through FIFO 403 to character specific gap inserter 404. If character specific gap inserter 404 is not able to handle the bytes from FIFO 403 fast enough such that FIFO 403 begins to fill-up, FIFO 403 may signal FIFO 401 to pause its data transfer to gap inserter 402.

Figure 5:
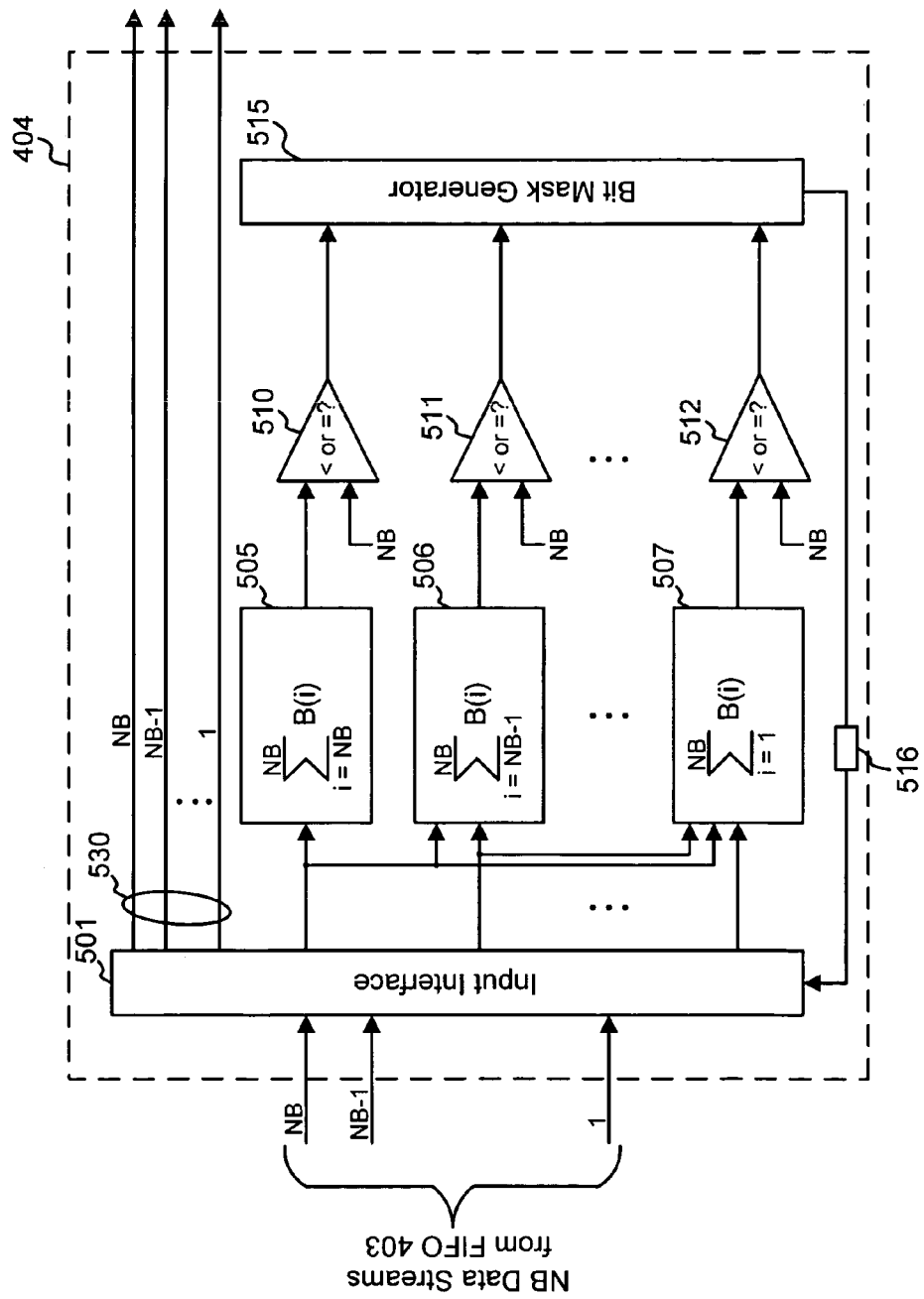
FIG. 5 is a diagram conceptually illustrating an implementation of the gap inserter shown in FIG. 4.

FIG. 5 is a diagram conceptually illustrating an implementation of character specific gap inserter 404, which inserts gaps based on control characters in the data stream. Input interface 501 receives the NB wide block of data in the stream from FIFO 403. The data paths in the data block are labeled as paths one through path NB. Input interface 501 transmits the received bytes (also called characters) to summers 505–507. More particularly, input interface 501 arranges the bytes in the data stream so that the next byte in the data stream (i.e., the most significant byte in the data stream) is output to summer 505, the next most significant byte in the data stream is output to summer 506, and so on, until the least most significant byte in the data stream is output to summer 507.

Each of summers 505–507 calculates a sum based on one or more input bytes. Specifically, summer 505 calculates a sum based on input byte NB and summer 506 calculates a sum based on input byte NB and input byte NB-1. The last summer, summer 507, calculates a sum based on all of input bytes one through NB. Summers 505–507 assign each input byte a value of two if the byte is content data that corresponds to a control character and a value of one otherwise. Stated more formally, summers 505–507 each calculate the sum:

$$\sum_i B(i)$$

where i indexes the input bytes and B(i) is equal to two if the indexed byte corresponds to a control character and one otherwise. For each summer 505–507, i runs from the main input byte associated with the summer (i.e., NB for summer 505, NB-1 for summer 506, and 1 for summer 507) to NB.

The output sums from summers 505–507 are input to comparators 510–512. Each of comparators 510–512 compares its input sum to NB, and outputs a logic one if the sum is less than or equal to NB, and a logic zero otherwise. The results of all the comparators 510–512 are concatenated together by bit mask generator 515 and transferred back to input interface 501 as bit mask 516.

After receiving bit mask 516, input interface 501 shifts the input data block to output lines 530 based on bit mask 516.

Summers 505–507 and comparator 510–512, although shown as a logical connection of discrete components, may be implemented as a single combinatorial logic circuit.

Figure 6:
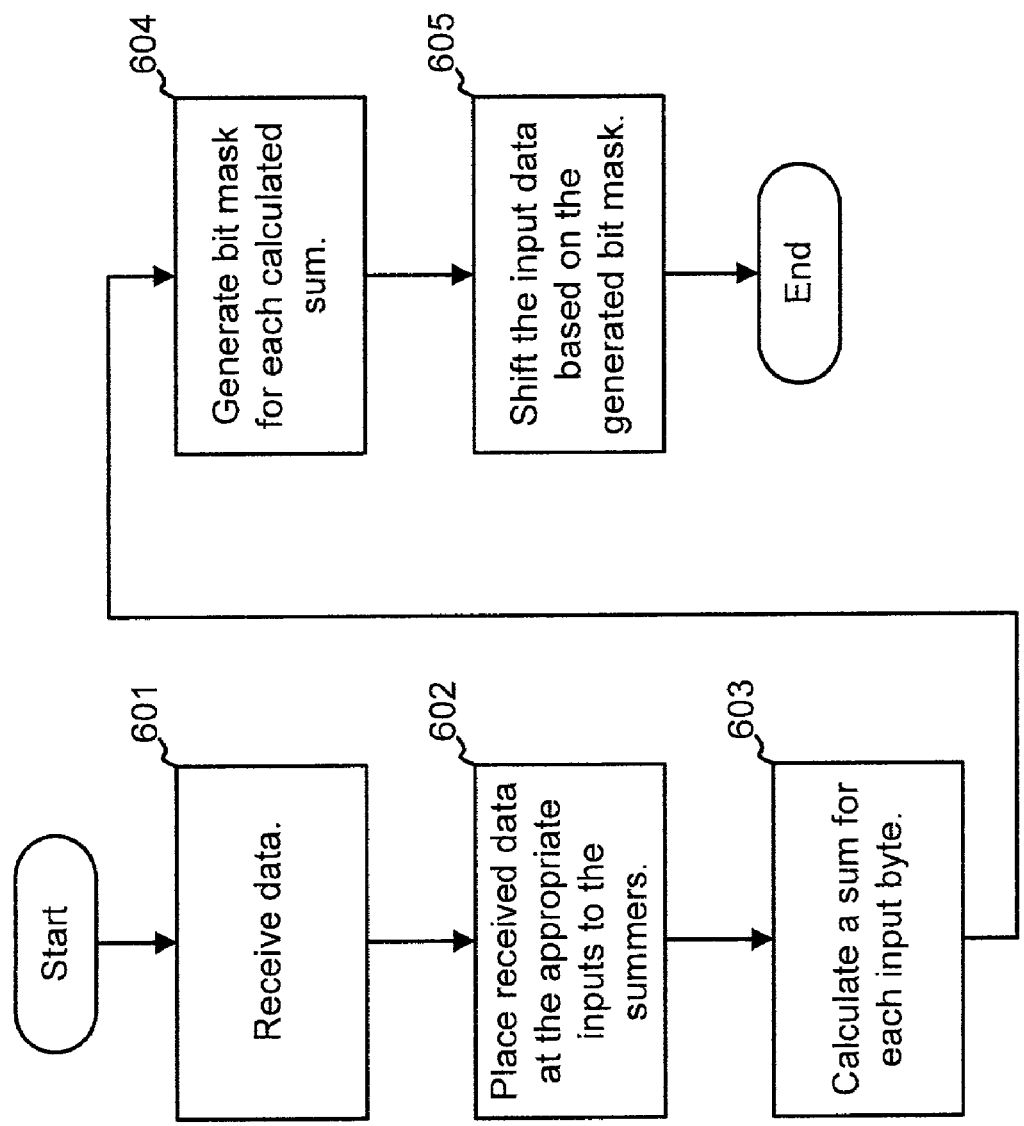
FIG. 6 is a flow chart illustrating methods for operating the gap inserter consistent with principles of the present invention.

The operation of character specific gap inserter 404 will now be described in more detail with reference to FIGS. 6 and 7. FIG. 6 is a flow chart illustrating operation of character specific gap inserter 404 consistent with principles of the invention. FIG. 7 illustrates exemplary values of a four byte wide data stream (NB=4) as it passes through gap inserter 402.

Character specific gap inserter 404 begins by receiving bytes in the data stream from FIFO 403, (Act 601), and placing the received bytes at the input to summers 505–507. (Act 602). The most significant byte (MSB) (i.e., the next byte in the data stream) received from FIFO 403 is output to the first open one of summers 505–507. Thus, if in the previous shift based on bit mask 516, two of four bytes were shifted to output lines 530, input interface 501 would receive the next two bytes from FIFO 401 and place these two bytes at the inputs of the summer 505–507 that are associated with bytes one and two. The third and fourth bytes would still be present at the input to the third and fourth summers from the previous shift operation.

In FIG. 7, four exemplary bytes are shown, labeled as bytes "A," the most significant byte, through byte "D", the least significant byte. Assume that byte "B" is an escapable character (indicated by the ^ symbol).

When all the input bytes are properly placed at the input to summers 505–507, the summers generate their respective sums. (Act 603). Comparators 510–512 then generate the individual bits for bit mask 516 based on the summed values. (Act 604). In FIG. 7, the sum associated with byte "A" is one, as the first summer sums only the value associated with byte "A". Because byte "A" is not an escape character, its associated value is one. The sum associated with byte "B" is the sum of the value of byte "A" plus the value of byte "B". Because byte "B" is an escape character, its associated value is two, and the final sum is thus equal to three. Similarly, bytes "C" and "D", because they are not escape characters, are associated with the value one, and therefore, their associated sums are 4 and 5, respectively. In this example, NB equals four. Accordingly, the comparison by the first three summers is true, while the comparison by the last summer returns false, thus generating the bit mask "1110".

After generating the bit mask, input interface 501 shifts the input bytes "upwards" to output lines 530 based on the logic ones in the bit mask. (Act 605). In FIG. 7, the three one bits in the bit mask indicate that input interface 501 is to shift three times, thereby shifting the input bytes up three positions into the four byte output datapath. Accordingly, the output bytes in data path 530 include a blank byte followed by "A", "B", and "C".

Expansion component 407 receives the blocks of NB wide data streams, including the gaps inserted by gap inserter 402 and character specific gap inserter 404, and rearranges each block such that the gaps are in a position appropriate for the block. For the four bit wide block shown in FIG. 7, for example, byte unpacker 404 moves the gap to the position immediately before byte "B".

Figure 8:
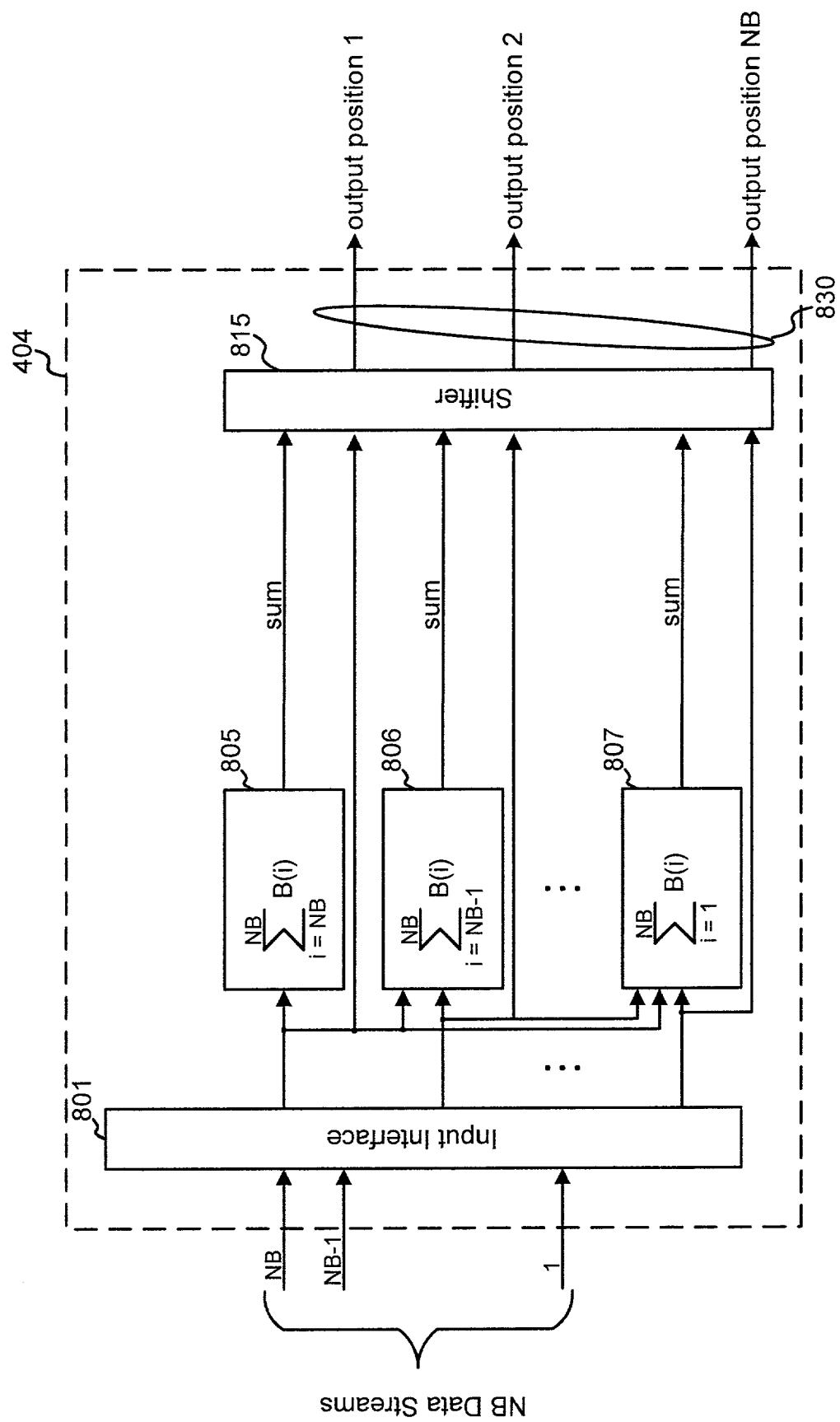
FIG. 8 is a diagram conceptually illustrating an implementation of a byte unpacker.

FIG. 8 is a diagram conceptually illustrating an implementation of expansion component 407. Expansion component 407 includes an input interface 801 that receives the blocks created by character specific gap inserter 404. Input interface 801 transmits the non-blank bytes in a block to summers 805–807. Summers 805–807 operate identically to summers 505–507. Shifter 815 shifts each byte in the input data block based on the sum value calculated for the byte by the corresponding one of shifters 805–807. Specifically, each byte is shifted to an output position in out data lines 830 based on its sum value, where the most significant byte is considered to be located at position 1 and the least significant byte is located at output position NB. In terms of the example shown in FIG. 7, byte "A" has a sum of one and is thus placed in the first position, byte "B" has a sum of three and is thus placed in the third position, and byte "C" has a sum of four and is thus placed in the fourth position. The second position now holds the gap that will be later used to hold the escape character.

Escape character inserter 405 receives the blocks of data, including the appropriately located gaps, from expansion component 407. At each gap, escape character inserter inserts the predetermined escape byte, such as "h7D." Escape character inserter 405 may also modify the content data byte corresponding to the escape byte by, for example, exclusive-ORing the content data byte with a predetermined constant, such as "h20."

As described above, a pipelined escape character inserter inserts gaps in a multi-byte wide datapath at positions corresponding to locations at which escape characters are to be inserted. The pipelined escape character inserter efficiently calculates the positions at which to insert the gaps. Accordingly, the complexity of the inserter scales linearly with the width of the data path.

Although described in the context of a router, concepts consistent with the principles of the invention can be implemented in any system that uses a point-to-point data stream that includes control information embedded in the data stream as control characters. Additionally, although the continuous data streams described above were primarily described using information bytes as the basic unit of transmission, this is an arbitrary unit and could accordingly be modified to other sizes.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A device for inserting escape characters into a multi-byte wide data stream, comprising:
    a gap insertion component configured to receive blocks of data of the multi-byte wide data stream, the gap insertion component rearranging the bytes of a block of the data stream by inserting gaps into the block at locations adjacent to predetermined bytes, the gap insertion component further including
        a character specific gap inserter configured to receive the blocks of data and to rearrange the blocks of data such that output blocks of data include a number of gaps equal to a required number of gaps, and
        an expansion component connected to receive the output blocks from the gap inserter and rearrange the gaps in the output blocks to locations in the blocks adjacent to the predetermined bytes; and
    an escape character inserter configured to insert escape characters in each of the gaps inserted by the gap insertion component.

2. The device of claim 1, wherein the predetermined bytes are bytes that have a value coincident with predefined control characters.

3. The device of claim 2, wherein at least one of the predefined control characters is used to delineate between information in the data stream.

4. The device of claim 2, wherein the escape character inserter logically exclusive-ORs each of the bytes that have a value coincident with the predefined control characters with a constant.

5. The device of claim 1, wherein the character specific gap inserter comprises:
    an input interface connected to shift bytes in the blocks based on a bit mask;
    a series of summers connected to the input interface;
    a comparator corresponding to each of the summers; and
    a bit mask generator connected to the comparators, the bit mask generator generating the bit mask based on outputs of the series of summers.

6. The device of claim 1, wherein the gap inserter and the expansion component are arranged in a pipelined configuration.

7. The device of claim 5, wherein the expansion component further comprises:
    a second series of summers; and
    a shifter configured to shift the data blocks received by the expansion component based on outputs from the second series of summers.

8. A method for inserting gaps in a data stream having a plurality of data elements transmitted as parallel blocks of data, the method comprising:
    generating a sum for each data element of a block based on whether the data element has a value equivalent to a control character and on the sum of more significant data elements in the active block;
    comparing the sum associated with each of the data elements of the block with a total number of data elements in the block;
    creating a bit mask based on the comparison; and
    shifting a number of data elements out of the block based on the bit mask.

9. The method of claim 8, wherein generating the sum for each data element further comprises:
    adding one to the sum when the data element does not have a value equal to the control character; and
    adding two to the sum when the data element has a value equal to the control character.

10. The method of claim 8, wherein comparing the sum associated with each of the data elements further comprises:

generating a logic one for each of the data elements of the block in which the total number of data elements in the block is greater than or equal to the sum associated with the data element; and generating a logic zero for each of the data elements of the block in which the total number of data elements in the block is less than the sum associated with the data element.

11. The method of claim 10, wherein creating the bit mask based on the comparison further comprises:

concatenating the generated logic one and logic zeros to create the bit mask.

12. The method of claim 8, further comprising:

generating second sums for blocks of the shifted data elements; and rearranging the shifted data elements based on the second sums such that gaps are rearranged in the blocks of shifted data elements to locations adjacent to data elements that have a value coincident with a control character.

13. A network device comprising:

a switch fabric;

a plurality of processing elements connected by the switch fabric, the processing elements communicating with one another over the switch fabric and receiving external information formatted as data items in a multi-item wide data stream; and at least one interface connected to each of the plurality of processing elements, the interface formatting the data streams before transmitting the data stream to others of the processing elements, the interface including a gap insertion component configured to rearrange blocks of the data items by inserting gaps in the blocks of the data items at locations adjacent to the predefined data items that have a value coincident with a predefined control character, and an escape character inserter configured to insert escape characters in each of the gaps inserted by the gap insertion component.

14. The network device of claim 13, wherein the gap insertion component and the escape character inserter are arranged in a pipelined structure.

15. The network device of claim 13, wherein the gap insertion component further comprises:

a gap inserter configured to receive the blocks of the data items and to rearrange the blocks such that output blocks of the data items include a predetermined number of gaps; and an expansion component connected to receive the output blocks from the gap inserter and to rearrange the gaps in the output blocks to locations in the blocks adjacent to the data items that have a value coincident with the predefined control character.

16. The network device of claim 15, wherein the gap inserter comprises:

an input interface configured to shift data items in the blocks based on a bit mask;

a series of summers connected to the input interface;

a comparator corresponding to each of the summers; and a bit mask generator connected to the comparators, the bit mask generator generating the bit mask based on outputs of the series of summers.

17. The network device of claim 16, wherein the expansion component further comprises:

a second series of summers; and a shifter configured to shift the data blocks received by the expansion component based on outputs from the second series of summers.

18. The device of claim 13, wherein at least one of the predefined control characters is used to delineate between information in the data stream.

19. The network device of claim 13, wherein the escape character inserter logically exclusive-ORs each of the bytes that have a value coincident with the predefined control characters with a constant.

20. The network device of claim 13, wherein the data items are bytes of data.

21. The network device of claim 13, wherein the processing elements are packet forwarding engines.

22. A system comprising:

means for inserting gaps into a multi-unit wide data stream at locations in the data stream at which an escape character will be required, the means for inserting gaps including summing means for generating sums for parallel data units in the data stream, and shifting means for shifting the parallel data units in the data stream based on the generated sums; and means for inserting escape characters in each of the gaps inserted by the means for inserting.

23. The system of claim 22, wherein the means for inserting gaps further includes:

comparison means for generating a bit mask based on the generated sums, wherein the shifting means shifts the parallel data units in the data stream based on the bit mask.

\* \* \* \* \*